(12) United States Patent
Wieres et al.

(10) Patent No.: US 7,713,322 B2
(45) Date of Patent: May 11, 2010

(54) FILTER LAYER FOR AN, IN PARTICULAR CONICAL, HONEYCOMB BODY FOR EXHAUST GAS TREATMENT, METHOD FOR MANUFACTURING THE FILTER LAYER, HONEYCOMB BODY AND EXHAUST GAS PURIFICATION DEVICE

(75) Inventors: Ludwig Wieres, Overath (DE); Ferdi Kurth, Mechernich (DE); Jörg Gutowski, Eisenach (DE); Hans-Günter Faust, Köln (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 42 days.

(21) Appl. No.: 11/970,786

(22) Filed: Jan. 8, 2008

(65) Prior Publication Data

US 2008/0148945 A1 Jun. 26, 2008

Related U.S. Application Data

(63) Continuation of application No. PCT/EP2006/006658, filed on Jul. 7, 2006.

(30) Foreign Application Priority Data

Jul. 8, 2005 (DE) .................. 10 2005 032 348

(51) Int. Cl.
*B01D 46/00* (2006.01)
*B01D 39/20* (2006.01)
*F01N 3/022* (2006.01)

(52) U.S. Cl. ............. 55/482; 55/282.3; 55/385.3; 55/483; 55/484; 55/498; 55/521; 55/525; 55/527; 55/DIG. 5; 55/DIG. 10; 55/DIG. 30; 60/311; 422/180; 210/345

(58) Field of Classification Search ............. 55/282.2, 55/282.3, 385.3, 482, 483, 484, 498, 520, 55/521, 525, 527, DIG. 5, DIG. 10, DIG. 30; 60/311; 422/180; 210/345
See application file for complete search history.

(56) References Cited

U.S. PATENT DOCUMENTS

| 4,159,951 | A | * | 7/1979 | Davis ..................... 210/331 |
| 4,430,223 | A | * | 2/1984 | Miyakawa et al. .......... 55/498 |
| 5,506,028 | A | | 4/1996 | Brück |
| 5,922,095 | A | | 7/1999 | Hustvedt et al. |
| 6,190,784 | B1 | | 2/2001 | Maus et al. |
| 6,720,060 | B1 | | 4/2004 | Swars |
| 6,946,012 | B1 | * | 9/2005 | Miller et al. ............... 55/521 |
| 2002/0197193 | A1 | | 12/2002 | Harada et al. |
| 2003/0086837 | A1 | * | 5/2003 | Bruck et al. ............... 422/180 |

(Continued)

FOREIGN PATENT DOCUMENTS

DE 966984 9/1957

(Continued)

*Primary Examiner*—Jason M Greene
(74) *Attorney, Agent, or Firm*—Laurence A. Greenberg; Werner H. Stemer; Ralph E. Locher

(57) ABSTRACT

A filter layer includes at least partially gas-permeable material having a plurality of segments joined to one another in such a way that the filter layer has non-parallel edges. Inexpensive manufacturing methods for such a filter layer, conical honeycomb bodies having the filter layer and particle-filtering exhaust gas purification apparatuses for motor vehicles, are also provided.

19 Claims, 4 Drawing Sheets

U.S. PATENT DOCUMENTS

| | | |
|---|---|---|
| 2003/0202919 A1* | 10/2003 | Bruck et al. ............... 422/180 |
| 2004/0013580 A1 | 1/2004 | Brück et al. |
| 2005/0232830 A1 | 10/2005 | Bruck |
| 2006/0144900 A1 | 7/2006 | Hirth et al. |
| 2008/0087489 A1* | 4/2008 | Bruck et al. ............... 55/385.3 |

FOREIGN PATENT DOCUMENTS

| | | |
|---|---|---|
| DE | 201 17 873 U1 | 2/2002 |
| EP | 1249262 A1 | 10/2002 |
| WO | 97/49905 A1 | 12/1997 |
| WO | 2004/050219 A1 | 6/2004 |
| WO | 2005/019617 A1 | 3/2005 |

* cited by examiner

FILTER LAYER FOR AN, IN PARTICULAR CONICAL, HONEYCOMB BODY FOR EXHAUST GAS TREATMENT, METHOD FOR MANUFACTURING THE FILTER LAYER, HONEYCOMB BODY AND EXHAUST GAS PURIFICATION DEVICE

CROSS-REFERENCE TO RELATED APPLICATIONS

This is a continuation, under 35 U.S.C. §120, of copending International Application No. PCT/EP2006/006658, filed Jul. 7, 2006, which designated the United States; this application also claims the priority, under 35 U.S.C. §119, of German Patent Application DE 10 2005 032 348.0, filed Jul. 8, 2005; the prior applications are herewith incorporated by reference in their entirety.

BACKGROUND OF THE INVENTION

Field of the Invention

The present invention relates to a filter layer having at least partially gas-permeable material, as well as a manufacturing method for such a filter layer. The invention also relates to advantageous embodiments of honeycomb bodies and exhaust gas purification devices, in particular for the treatment of motor vehicle exhaust gases.

In the purification of exhaust gases of mobile or stationary internal combustion engines, in addition to the chemical conversion of gaseous pollutants, the focus of present interest is also on the retention and conversion of particles (such as soot, ash and the like). Soot filters which are known to reduce particle emissions, are constructed from a ceramic substrate and have channels into which the exhaust gas to be purified can flow. Adjacent channels are alternately closed off, in such a way that exhaust gas enters into the channel at the inlet side, passes through a ceramic wall and escapes again through an adjacent channel at the outlet side. A disadvantage of that concept is that reliable regeneration of the soot filter in the exhaust system of an automobile always presents problems. The regeneration of the soot filter is necessary since the increasing accumulation of particles in the channel walls through which the flow is to pass results in an ever-increasing pressure loss which adversely affects the engine performance. The regeneration includes the brief heating of the soot filter and of the particles which are accumulated therein, in such a way that the particles are converted into gaseous constituents. A regeneration of that type results in a high thermal loading of the soot filter, as a result of which a reduced service life is to be expected.

In order to avoid the discontinuous and thermally highly wear-promoting regeneration, a system for the continuous regeneration of filters has been developed (CRT: continuous regeneration trap). In a system of that type, the particles are burned at temperatures already above 200° C. through the use of oxidation with $NO_2$. The $NO_2$ required for that purpose is often generated through the use of an oxidation catalytic converter which is disposed upstream of the particle trap. In order to provide the required quantity of $NO_2$, it is also possible for additives to be supplied to the exhaust gas (for example urea).

It has also been recognized that the conversion of the pollutants in the exhaust gas is improved if a long residence time of the still unconverted particles in the filter is ensured. In that connection, a concept has been developed which has substantially become known under the term "open filter system". The open filter system is distinguished by dispensing with a structural alternating closure of all of the filter channels. It is provided that the channel walls are constructed at least partially of porous material, and that the flow channels of the open filter have deflecting or guide structures. The fittings have the effect of deflecting the flow and the particles contained therein to the regions of porous material. In that case, it has surprisingly been proven that a very large proportion of the particles remain adhered on and/or in the porous channel wall. Pressure differences in the flow profile of the flowing exhaust gas are of significance for the accumulation of those effects. As a result of the deflection, it is additionally possible for local vacuum conditions or excess pressure conditions to be generated, which lead to a filtration effect through the porous wall.

The particle trap, in contrast to the known closed sieve or filter systems, is open, because no flow dead-ends are provided. A property can therefore also serve to distinguish such particle traps such that, for example, a parameter of "freedom of flow" is suitable as a description. A freedom of flow of 20% thus means that, when viewing a (or every) cross section, approximately 20% of the area is not closed off. For clarification of those concepts, reference is made, in particular, to International Publication No. WO 2004/050219, corresponding to U.S. Patent Application Publication No. US 2005/0232830 A1 and German Utility Model DE 201 17 873 U1, corresponding to U.S. Patent Application Publication No. US 2004/0013580 A1, the content of which is incorporated herein by reference in order to supplement the description of the construction of an open particle trap. In the manufacturing of open particle traps, in particular, metallic materials have been proven to be particularly flexible, so that particle traps of that type are preferably formed with metallic foils and/or metallic filter layers.

With regard to the different fields of use for exhaust gas purification devices and particle traps of that type, a multiplicity of different shapes and configurations are to be provided. For example, (metallic) exhaust gas purification devices which are constructed in layers can be constructed as a stack, as a coil and the like. In that case, a filter layer composed of at least partially gas-permeable material is often used and is constructed and positioned corresponding to the desired shape of the exhaust gas purification device. In order to avoid expensive manufacturing processes with regard to the filter layer, it has heretofore been conventional to use merely strip-shaped or rectangular filter layers for manufacturing exhaust gas purification devices.

SUMMARY OF THE INVENTION

It is accordingly an object of the invention to provide a filter layer for an, in particular conical, honeycomb body for exhaust gas treatment, a method for manufacturing the filter layer, a honeycomb body and an exhaust gas purification device, which overcome the hereinafore-mentioned disadvantages and at least partially alleviate or solve the technical problems of the heretofore-known devices and methods of this general type. It is intended, in particular, to propose a filter layer which should simplify the manufacturing of exhaust gas purification devices, in particular of particle traps, for the automotive field, wherein, in particular, the range of embodiments, shapes and variants of the exhaust gas purification device should be ensured. In addition, cost-effective and flexible manufacturing of filter layers of that type should be ensured.

With the foregoing and other objects in view there is provided, in accordance with the invention, a filter layer, comprising at least partially gas-permeable material having a plurality of segments joined to one another to define opposite filter layer edges of different length.

The filter layer is preferably composed of a high-temperature-resistant and corrosion-resistant material, so that the filter layer can also specifically withstand the thermal and dynamic loadings in the exhaust system of a motor vehicle. In this case, the material is preferably a steel material which, for example, has high proportions of aluminum (for example at least 4.5% by weight), chromium (for example approximately 19% by weight) and/or nickel, although it is also possible for the material to include a ceramic or ceramic-like material. The gas-permeable material itself can include the material components of powder, fibers and/or mixtures thereof. The material components are preferably joined to one another in a cohesive or bonded manner, in particular welded to one another and/or brazed or hard-soldered to one another and/or sintered with one another.

With regard to the "gas permeability" of the material, it is to be noted that the filter layer can also have regions (for example at most 20% of the entire area) with gas-impermeable material, although these regions are preferably formed at least at one edge of the filter layer. It is additionally possible for the filter layer to be formed with a type of supporting structure (for example an expanded metal) which is itself gas-impermeable but which includes a plurality of partial regions with gas-permeable material. It is also possible for a joining region to be formed in the region of the joint regions of adjacent segments. The joining region has at least a reduced gas permeability or is, if appropriate, even gas-impermeable.

The gas-permeable material is preferably a metallic fibrous material. The term "fibers" is to mean elongate metallic elements such as for example wires, threads, fibers and the like. The metallic fibers are preferably formed with a fiber length in the range of from 0.1 mm to 50 mm (in particular in a range from 1 mm to 10 mm) and a fiber diameter in the range of from 0.01 mm to 0.1 mm (in particular in a range of from 0.02 mm to 0.05 mm). The metallic fibers include, in particular, a material which substantially includes steel as a base material, with preferably high proportions of chromium (for example in a range from 18 to 21% by weight) and/or aluminum (for example at least 4.5% by weight, in particular at least 5.5% by weight). It is possible for different layers with different embodiments (for example with regard to length, material, cross-sectional shape, orientation, etc.) of the fibers to be provided within a filter layer. The porosity of a fibrous nonwoven of this type is preferably in a range of from 60 to 85%.

The filter layer according to the invention has a plurality of segments, so that the filter layer is formed for example with more than three (3), five (5) or seven (7) segments. The segments preferably have the same filter properties or the same gas-permeable material, although this is not necessarily the case. The segments are preferably a planar structure with the desired dimensions. Each of the segments is jointed, preferably captively, to at least one further segment. As a result, the ultimate configuration of the filter layer can vary widely, by virtue of the segments being combined, for example in the manner of a "patchwork rug".

It is, for example, now possible for the filter layer to be formed with opposite edges of different length. If the one edge for example forms a straight line, then the opposite edge can be formed as a curved line (for example with a rolling and/or angular profile). With the construction of the filter layer as a planar structure, the edges preferably describe the greatest extent of the filter layer in the plane. It was previously necessary to provide a separate tool, in particular a punching tool or a complicated, flexibly activatable cutting machine, for each such special shape of the filter layer. Now, however, the different constructions of the filter layer can be manufactured by joining the segments together. This results in both cost-effective as well as flexible manufacturing of different filter layers even within the context of series manufacturing.

In accordance with another feature of the invention, the filter layer has at least one segment in the shape of a trapezoid. The trapezoid is preferably of equilateral configuration. Such an embodiment of the segments can, on one hand, be manufactured easily from a strip-shaped raw material and, on the other hand, permits the formation of relatively complex shapes of the filter layer.

In accordance with a further feature of the invention, the segments form an equal-sized filter area. This leads, in later use, to a uniform filter efficiency, on one hand, and results in simplified handling of the segments for example during storage, transport and the manufacturing of filter layers, on the other hand. The filter area of the segments is, for example, in a range of from 100 to 1,000 $cm^2$.

In accordance with an added feature of the invention, the filter layer has the shape of a circular ring element. This means, in other words, that the opposite edges have substantially the shape of a circular arc section. The circular arc sections are disposed concentrically with respect to one another, with the circular arc sections being formed with different length. Such a shape of the filter layer, in which the segments are advantageously disposed in a row permits, for example, the cost-effective manufacturing of honeycomb bodies with a conical shape.

In accordance with an additional feature of the invention, at least some of the plurality of segments are directly joined to one another in a cohesive or bonded manner. This means, in other words, that intermediate elements between the segments are dispensed with in this case, and a direct joining of the respective gas-permeable material is provided. The joining process includes, in particular, brazed or hard soldered joining, welded joining and/or sintered joining.

In accordance with yet another feature of the invention, the filter layer has a gas-impermeable flange in the region of at least one edge. A construction in which the two opposite edges are formed over the entire length in each case with one flange, is preferable in this case. In this case, the flange is preferably formed with a metal foil which is bent around the respective edge and is joined to the material of the filter layer through the use of technical joining, in particular cohesive joining or bonding. With a flange of this type, a joining region for joining a plurality of filter layers through the use of brazing or hard soldering, on one hand, and a flange at the same time serving to prevent parts of the gas-permeable material from becoming detached due to the high thermal and dynamic loadings in the exhaust system of a motor vehicle, on the other hand, is preferable in this case. The metal foil preferably has a width in the range of from 5 to 30 mm. It is to be noted that it is not necessary for the flange to surround at least a part of the gas-permeable material of the filter layer, but it is in fact also possible for the flange to adjoin the edge or bear at one side against the gas-permeable material.

With the objects of the invention in view, there is furthermore provided a honeycomb body, comprising at least one filter layer according to the invention, at least one at least partially structured metal foil, and a conically-shaped housing. The at least one filter layer and the at least one metal foil are disposed in the housing and form a multiplicity of channels each having a varying channel cross section.

With regard to the construction of a conically-shaped honeycomb body, reference is made herein to International Publication No. WO 97/49905, corresponding to U.S. Pat. No. 6,190,784, which is expressly incorporated herein by reference in a supplementary fashion for clarification of the geometries. For the manufacturing of a honeycomb body of that type, for the smooth filter layer in particular, a shape is required which corresponds approximately to the shape of a circular ring segment. An explanation was given above as to how the latter can be manufactured in a cost-effective and very flexible manner. The integration of a so-called filter layer into a conically-shaped honeycomb body therefore permits cost-effective manufacturing.

In addition, it is also to be pointed out that a varying channel cross section means, in particular, that there is a continuous decrease in size or increase in size of the channel cross section from one end side of the honeycomb body to the opposite end side. It is, however, likewise possible for the channel cross section to vary only locally in one section of the channel, for example through the use of parts of the metal foil (such as guide faces, convexities or the like) which project into the channel. Very particularly preferable is the combination of a continuously varying channel cross section with local channel cross section narrowing locations.

In accordance with another feature of the invention, in this context, it is also proposed that the channels be at least partially closed off at least at one location. This firstly means, for example, that flow manipulators are provided in the interior of the channels (one possible "location"), that is to say for example guide faces, recesses and the like. It is also possible for additional materials to be placed in the interior of the channels, for example flow barriers, sieves, filter materials, etc. A further "location" for partially closing off the channels are the channels in regions adjacent the end sides of the honeycomb body. The channels could act in the manner of a plug and hinder or prevent the inlet or outlet of exhaust gas. A "partial" closure can mean that the channel is formed completely and/or partially with a gas-impermeable and/or a gas-permeable material. An embodiment with all of the channels being only partially closed off through the use of flow manipulators is preferable in this case.

With the objects of the invention in view, there is also provided a method for manufacturing a filter layer formed of at least partially gas-permeable material. The method comprises at least the following steps:

a) providing a strip-shaped metallic fibrous nonwoven;
b) dividing the fibrous nonwoven into a plurality of segments;
c) arranging the plurality of individual segments in such a way that the filter layer is formed with opposite edges of different length; and
d) joining the plurality of segments.

The method is preferably used for manufacturing an embodiment of the filter layer according to the invention.

According to step a), a substantially strip-shaped metallic fibrous nonwoven is firstly provided. With regard to the preferred embodiments of a metallic fibrous nonwoven of this type, reference is to be made to the above-specified parameters. The metallic fibrous nonwoven is now divided, as per step b), into a plurality of segments, with it being possible for this to take place by using suitable cutting and/or separating devices which are, if appropriate, also suitable for carrying out thermal separating processes. The plurality of segments is now (step c)) disposed in such a way that the filter layer with opposite edges of different length is formed. The "configuration" includes, in particular, positioning relative to one another, preliminary fixing, alignment and similar processes in order to form the filter layer, for example in the manner of a "patchwork rug". The segments which are pre-positioned in this way are now joined to one another individually or together to form the filter layer (step d)). The method described herein permits the cost-effective manufacturing of a multiplicity of individual shapes of filter layers. The method can also be integrated into a continuous process, for example within the context of series manufacturing of honeycomb bodies for exhaust gas purification devices, with the fibrous nonwoven or the segments being transported with a substantially constant feed movement as the method described herein is carried out.

In accordance with another mode of the method of the invention, a step ab) is also carried out between step a) and step b). The step ab) includes the attachment of a gas-impermeable flange in the region of at least one edge of the fibrous nonwoven. With regard to the embodiment of a flange of that type, reference is to be made to the explanations given above. The attachment of the gas-impermeable flange also preferably takes place continuously.

In accordance with a further mode of the method of the invention, one refinement of the method relates to the characteristic of step b), in which step b) includes cutting of the fibrous nonwoven in such a way as to generate cut profiles that are inclined and mirror-symmetrical with respect to a central axis of a segment. It is thereby possible to generate, in particular, equilateral trapezoids or segments in the manner of a circular ring segment. In order to manufacture the inclined, mirror-symmetrical cut profiles it is, for example, possible to use so-called "flying blades" or similar structures which permit a cutting process transversely with respect to the feed direction and during a continuous feed movement of the fibrous nonwoven. It is fundamentally also possible for conventional punches, laser-cutting tools and the like to be used for cutting the fibrous nonwoven.

In accordance with an added mode of the method of the invention, step c) includes alternating positioning of the segments. This means, in particular, that a strip-shaped fibrous nonwoven is divided into trapezoidal segments, for example by generating inclined and mirror-symmetrical cut profiles, with every second segment of the fibrous nonwoven being folded over by its edges or rotated. If the individual segments are now aligned with one another with respect to their sides, then the filter layer itself obtains a curved profile and corresponds to a shape of a circular segment.

In accordance with an additional mode of the method of the invention, it is particularly advantageous for at least one of the method steps ab) and d) to include welding through the use of roll seam welding. This therefore means either the attachment of the flange and/or the direct joining of the segments of gas-permeable material. With regard to the embodiment of the roll seam welding process, reference is additionally made to the content of the disclosure of International Publication No. WO 2005/019617 A1, corresponding to U.S. Patent Application Publication No. US 2006/0144900 A1. The explanations given therein are to be incorporated herein by reference in their entirety for the description of the roll seam welding process.

In accordance with yet another mode of the method of the invention, as an additional step e), a side-end machining process is carried out in which at least one side of the filter layer obtains a predefined shape. "Side" means, in particular, those delimitations of the filter layer or of the segment which adjoin the edges. The side-end machining process could be referred to as "bordering", which thus includes the separation of fibers, the compression of partial regions of the filter layer and the like. In this way, it is intended to ensure shape tolerances and/or predefined service life criteria.

With the objects of the invention in view, there is concomitantly provided an exhaust gas purification device for at least partially obstructing and at least partially converting particles of an exhaust gas flow of an internal combustion engine of a motor vehicle, which is proposed as a particularly preferred field of application. The exhaust gas purification device comprises:

a) at least one filter layer of the type described above or manufactured with the method described above, or b) at least one honeycomb body as described above.

Other features which are considered as characteristic for the invention are set forth in the appended claims, noting that the technical features specified individually in the claims can be combined with one another in any desired technologically expedient manner, with further embodiments of the invention being disclosed.

Although the invention is illustrated and described herein as embodied in a filter layer for an, in particular conical, honeycomb body for exhaust gas treatment, a method for manufacturing the filter layer, a honeycomb body and an exhaust gas purification device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
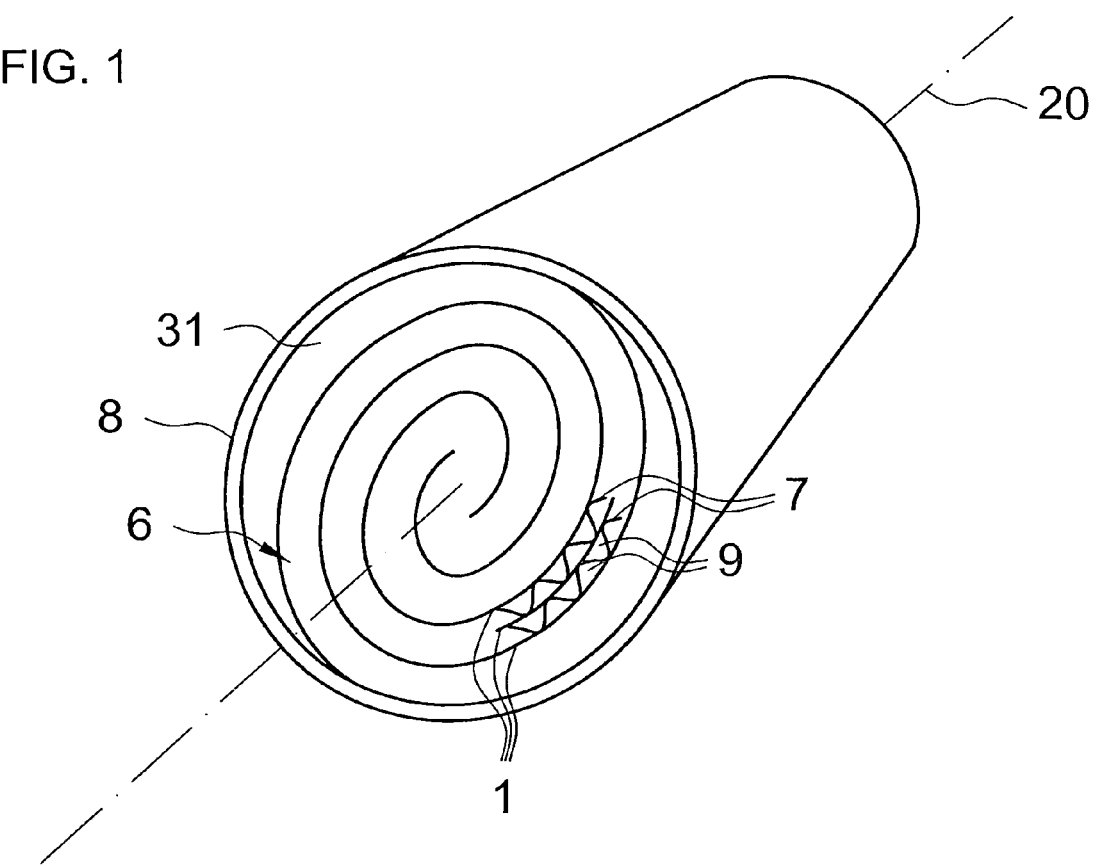
FIG. 1 is a diagrammatic, perspective view of a conical honeycomb body.

Referring now in detail to the figures of the drawings, which relate to particularly preferred embodiment variants of the invention, although the invention is not restricted thereto, in particular noting that size dimensions shown in the figures cannot be considered to be true to scale, and first, particularly, to FIG. 1 thereof, there is seen a honeycomb body 6 which includes a plurality of filter layers 1 and a plurality of entirely structured metal foils 7. The metal foils 7 are coiled or wound in such a way that they firstly form channels or passages 9 through which an exhaust gas can flow and secondly are accommodated in a conically-shaped housing 8. The channels or ducts 9 extend between two end sides 31 of the honeycomb body 6, with the channels 9 running substantially rectilinearly. However, due to the conical construction of the honeycomb body 6, the channels 9 do not run precisely parallel to a central axis 20 of the honeycomb body 6, but rather are inclined with respect to the central axis 20.

Figure 2:
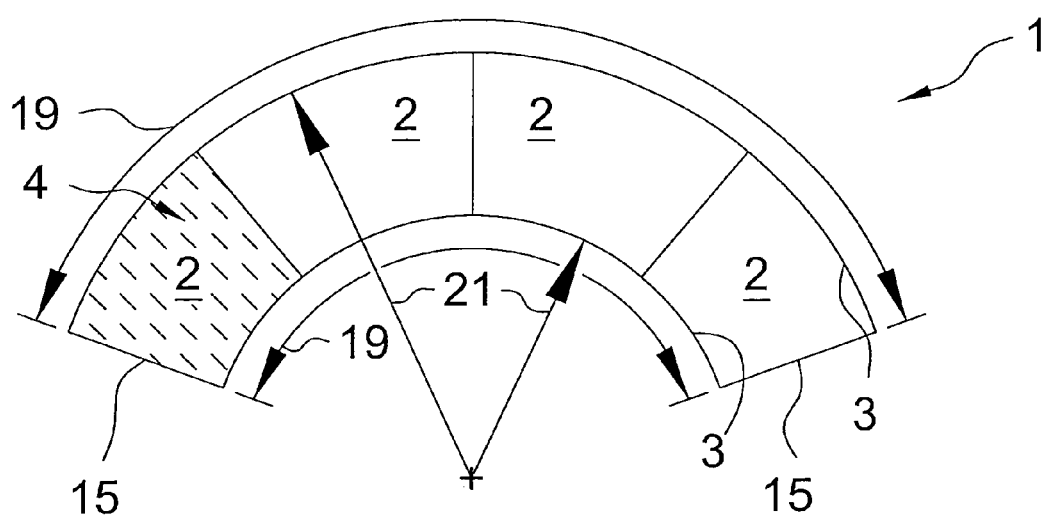
FIG. 2 is a plan view of a filter layer in the form of a circular ring segment.

FIG. 2 shows a filter layer 1 composed of a gas-permeable material, in this case a metallic fibrous nonwoven, which is formed by a plurality of segments 2, with the segments 2 being joined to one another in such a way that the filter layer 1 is formed with opposite edges 3 of different length 19. With the shape of the filter layer 1 as shown, the shape of a circular ring segment is realized, with the opposite edges 3 of the filter layer 1 encompassing a different radius of curvature 21 from one another. In this way, an "inner" length 19 (illustrated at the bottom of FIG. 2) is generated which is shorter than an "outer" length 19 (illustrated at the top in FIG. 2). The segments 2 have substantially the same filter area 4, and sides 15 are likewise formed with an equal extent. However, the latter is not strictly necessary.

FIGS. 3 to 6 show a method for manufacturing a filter layer 1 composed of gas-permeable material.

Figure 3:
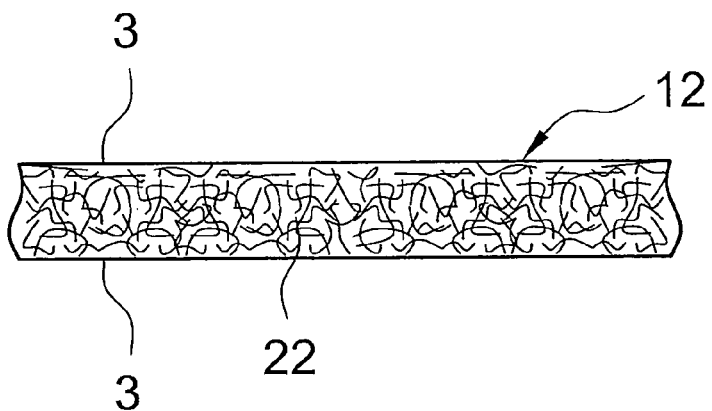
FIG. 3 is a fragmentary, longitudinal-sectional view of a fibrous nonwoven.

FIG. 3 shows the provision of a strip-shaped metallic fibrous nonwoven 12. The fibrous nonwoven 12 has a multiplicity of metallic fibers 22 which are preferably welded to or sintered with one another in the manner of a mixed layer. In the strip-shaped construction of the fibrous nonwoven 12, the eventual edges 3 lie in the direction of the extent of the strip-shaped fibrous nonwoven 12.

Figure 4:
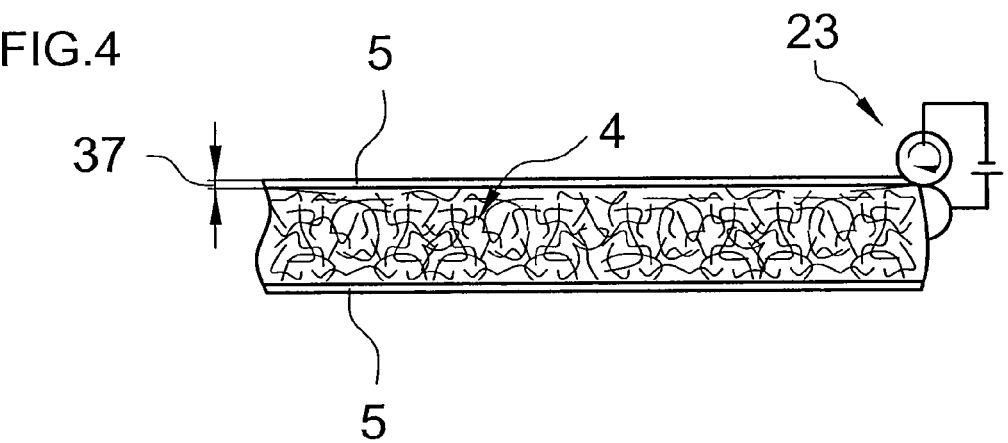
FIG. 4 is a fragmentary, longitudinal-sectional view of a fibrous nonwoven with a flange.

FIG. 4 shows an attachment of a gas-impermeable flange 5 in the region of the two opposite edges 3 of the fibrous nonwoven 12. For this purpose, a metal foil (not indicated) is bent around the edges 3 of the fibrous nonwoven to form the flange 5, in such a way that the metal foil extends over a width 37 of the fibrous nonwoven 12. The metal foil or the flange 5 is captively joined to the fibrous nonwoven 12 through the use of a roll seam welding system 23. The filter area 4 is not delimited by the two flanges 5.

Figure 5:
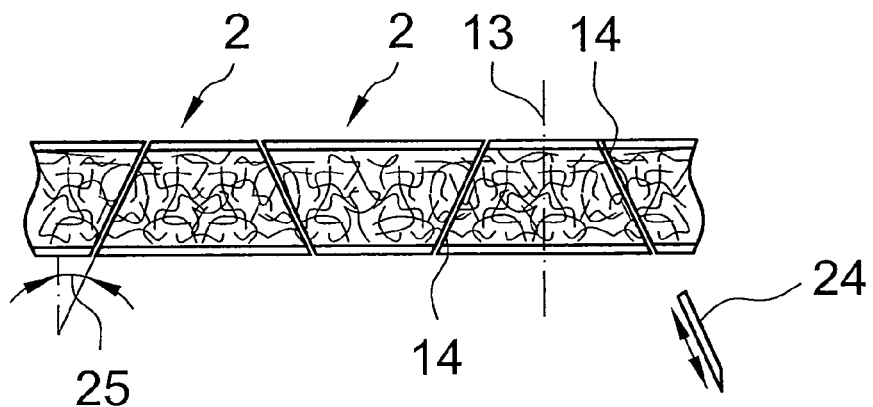
FIG. 5 is a fragmentary, longitudinal-sectional view of a fibrous nonwoven divided into segments, with a flange.

In a further method step seen in FIG. 5, the fibrous nonwoven 12 is divided into a plurality of segments 2. This takes place, for example, through the use of a diagrammatically indicated separating device 24, which is capable of breaking up the fibrous nonwoven 12. In the variant shown, the fibrous nonwoven 12 is cut in such a way as to generate cut profiles 14 which are inclined and mirror-symmetrical relative to a central axis 13 of the segment 2. The inclined cut profiles 14 can be distinguished on the basis of an angle 25 which preferably lies in a range of from 2 to 15 degrees.

Figure 6:
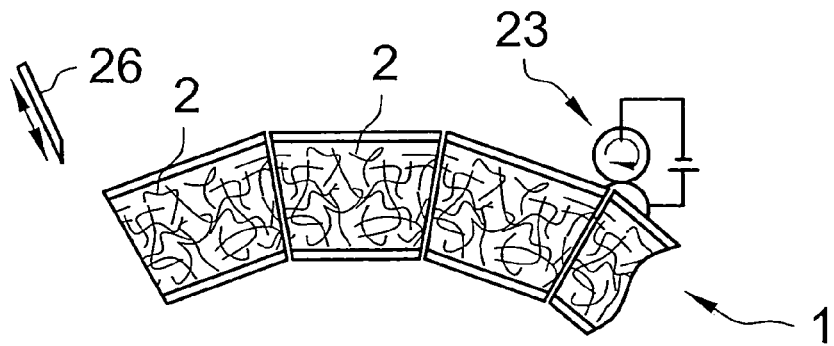
FIG. 6 is a fragmentary, longitudinal-sectional view of a filter layer with opposite edges of different length.

Finally, FIG. 6 shows a configuration of the plurality of segments 2 in such a way as to generate the filter layer 1 with opposite edges 3 of different length 19, and the subsequent joining of the segments 2, which is in turn carried out through the use of a roll seam welding system 23. In the variant illustrated herein, the segments 2 which were generated previously are positioned alternately, so as to provide a variant of the filter layer 1 in the manner of a circular ring segment. Side-end machining is carried out through the use of an illustrated shaping device 26.

Figure 7:
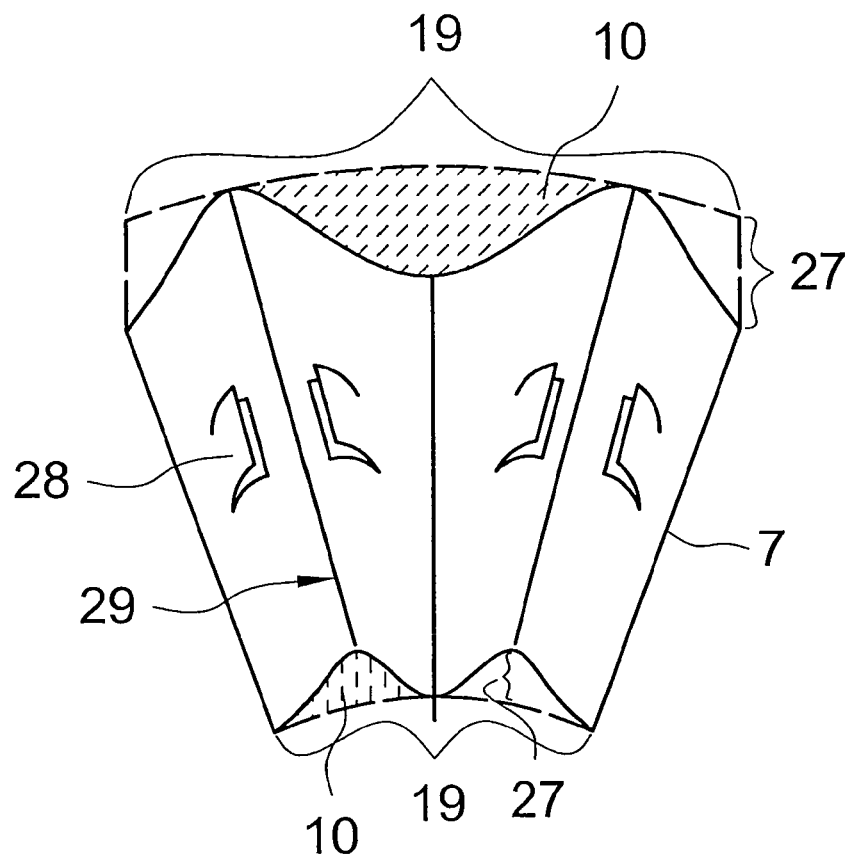
FIG. 7 is a fragmentary, perspective view of a conical honeycomb body.

FIG. 7 is a fragmentary view provided for clarifying the construction of the honeycomb body 6. The metal foil 7 is formed with a structure 29 and a smooth filter layer 1 bears against extrema, for example wave peaks and wave troughs, of the structure 29, as is indicated by a dashed line. The filter layer 1 and the metal foil 7 thereby delimit the channels 9 with a predefined channel cross section 10. Due to the conical construction of the honeycomb body 6 and the different lengths 19 of the edges 3 of the filter layer 1, a height 27 or the size of the channel cross section 10 varies in the channel direction. The metal foil 7 is formed with flow manipulators 28 which can be provided adjacent and/or in the extrema of the structure 29, for further targeted influencing of the exhaust gas flow. In addition, it is also pointed out that the metal foil 7 can be formed with some other material, for example it may also be formed as a filter layer 1 composed of a gas-permeable material.

Figure 8:
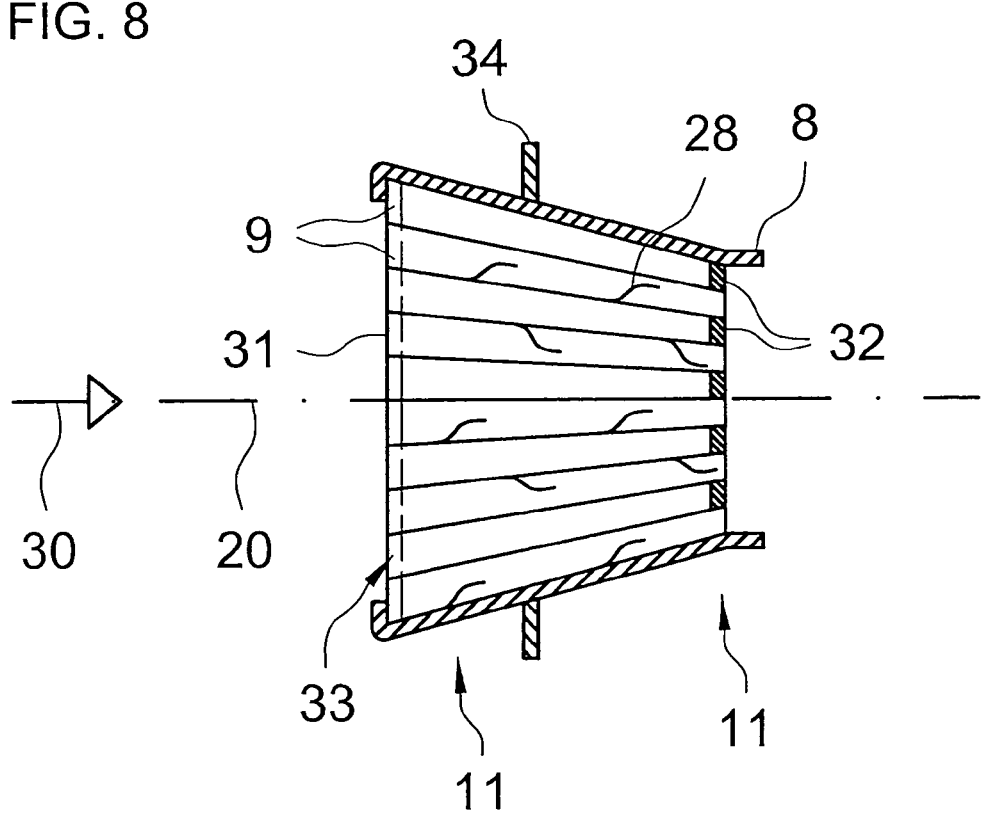
FIG. 8 is a cross-sectional view of an embodiment variant of a conical honeycomb body.

FIG. 8 serves to further illustrate flow conditions through a conical honeycomb body 6 of this type. The exhaust gas flows in a flow direction 30 to a first end side 31. There, the exhaust gas passes into the multiplicity of channels 9 which are delimited at least partially by a filter layer 1. The flow manipulators 28 and illustrated closure elements 32 partially close off at least a part of the channels 9, in such a way that the flow of exhaust gas is repeatedly forced to deflect, and at least the probability of the exhaust gas passing through the filter layer 1 is thereby increased. In this way, particles which are entrained in the exhaust gas can be relatively easily captured, with there often not being a risk of clogging of the filter. It is also shown that there can be both positions 11 in the interior of the channels 9 where a channel narrowing occurs, and in addition, a position 11 likewise formed in an end region close to an end side 31 by the closure element 32. The configuration or positioning of the flow manipulators 28 and/or of the closure elements 32 can be freely selected in an application-specific manner. In the embodiment variant shown, the conically-shaped housing is additionally formed with a projection 34 which serves, in particular, for the assembly of the honeycomb body 6 in an exhaust gas system of an automobile, preferably in the vicinity of the engine.

Figure 9:
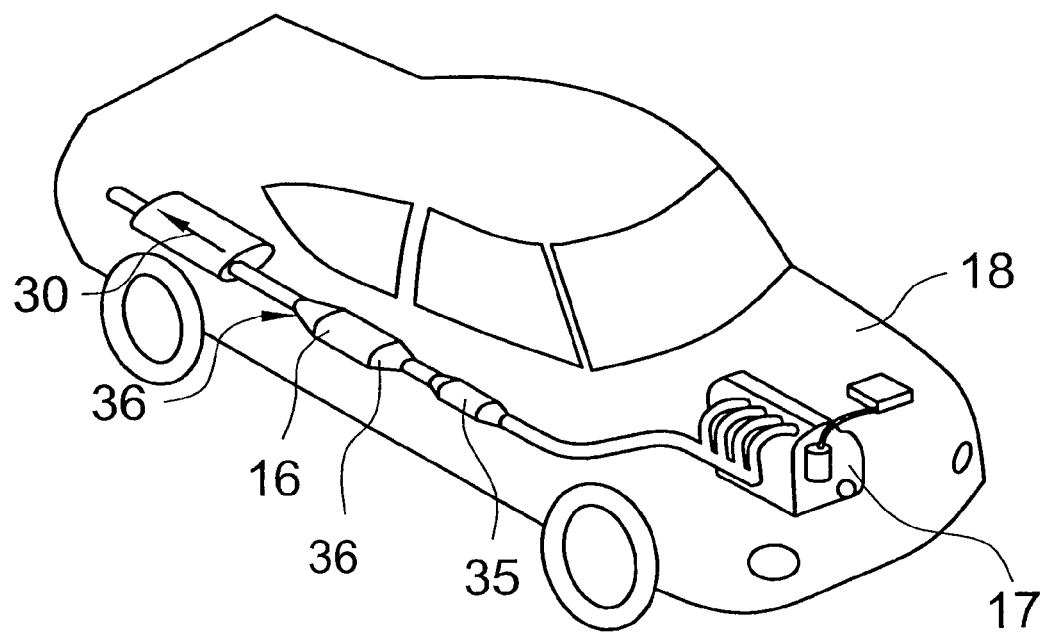
FIG. 9 is a perspective view of a motor vehicle with an exhaust system.

FIG. 9 diagrammatically shows a motor vehicle 18 with an internal combustion engine 17, preferably a diesel engine, the exhaust gas of which is conducted in the flow direction 30 through a plurality of exhaust gas purification devices 16. After flowing through an oxidation catalytic converter 35, the exhaust gas passes into a cone 36 in which an exhaust gas purification device having the filter layer described herein is provided. The cone 36 is adjoined, for example, by a further exhaust gas purification device 16 (3-way catalytic converter, adsorber, soot filter, etc.), before the exhaust gas is finally passed through a further cone 36 into a muffler, and emerges, purified, into the atmosphere.

The filter layer described herein permits cost-effective manufacturing and an advantageous integration of particle traps which are formed in this way as exhaust gas purification devices in exhaust systems of motor vehicles.

The invention claimed is:

1. A metallic filter layer for the treatment of exhaust gases of combustion engines, comprising:
    at least partially gas-permeable metallic fibrous material having a plurality of segments joined to one another to define opposite filter layer edges of different length, and
    a gas-impermeable flange in vicinity of at least one filter layer edge, said gas-impermeable flange being formed by a metallic foil.

2. The filter layer according to claim 1, wherein at least one of said segments has a trapezoid shape.

3. The filter layer according to claim 1, wherein said segments have equal-sized filter areas.

4. The filter layer according to claim 1, wherein the filter layer has a circular ring segment shape.

5. The filter layer according to claim 1, wherein at least some of said plurality of segments are directly joined to one another by bonding.

6. A honeycomb body, comprising:
    at least one filter layer according to claim 1;
    at least one at least partially structured metal foil; and
    a conically-shaped housing;
    said at least one filter layer and said at least one metal foil disposed in said housing and forming a multiplicity of channels each having a varying channel cross section.

7. The honeycomb body according to claim 6, wherein said channels are at least partially closed off at least at one location.

8. A method for manufacturing a filter layer formed of at least partially gas-permeable material, the method comprising the following steps:
    a) providing a strip-shaped metallic fibrous nonwoven;
    ab) attaching a gas-impermeable flange in vicinity of at least one edge of the fibrous nonwoven;
    b) dividing the fibrous nonwoven into a plurality of segments;
    c) configuring the plurality of segments to provide the filter layer with opposite edges of different length; and
    d) joining the plurality of segments together.

9. The method according to claim 8, wherein step b) includes cutting the fibrous nonwoven to generate cut profiles being inclined and mirror-symmetrical with respect to a central axis of a segment.

10. The method according to claim 8, wherein step c) includes alternating positioning of the segments.

11. The method according to claim 8, wherein at least one of steps ab) and d) includes welding by roll seam welding.

12. The method according to claim 8, which further comprises:
    e) carrying out a side-end machining process in which at least one side of the filter layer obtains a predefined shape.

13. An exhaust gas purification device, comprising:
    at least one filter layer according to claim 1 for at least temporarily obstructing and at least partially converting particles of an exhaust gas flow of an internal combustion engine of a motor vehicle.

14. An exhaust gas purification device, comprising:
    at least one filter layer manufactured according to claim 8 for at least temporarily obstructing and at least partially converting particles of an exhaust gas flow of an internal combustion engine of a motor vehicle.

15. An exhaust gas purification device, comprising:
    at least one honeycomb body according to claim 6 for at least temporarily obstructing and at least partially converting particles of an exhaust gas flow of an internal combustion engine of a motor vehicle.

16. The filter layer according to claim 1, wherein said gas-permeable metallic fibrous material is welded or brazed.

17. The filter layer according to claim 1, wherein said segments are welded or brazed to one another.

18. The honeycomb body according to claim 6, wherein said at least one filter layer is a plurality of filter layers brazed to one another.

19. The filter layer according to claim 1, wherein said metallic fibrous material has fibers welded to one another.

* * * * *